(12) United States Patent
Kauschke et al.

(10) Patent No.: US 9,450,888 B2
(45) Date of Patent: *Sep. 20, 2016

(54) PROVIDING A BUFFERLESS TRANSPORT METHOD FOR MULTI-DIMENSIONAL MESH TOPOLOGY

(71) Applicant: Intel Corporation, Santa Clara, CA (US)

(72) Inventors: Michael Kauschke, Braunschweig (DE); Gautam B. Doshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/063,858

(22) Filed: Oct. 25, 2013

(65) Prior Publication Data

US 2014/0050224 A1    Feb. 20, 2014

Related U.S. Application Data

(62) Division of application No. 12/827,495, filed on Jun. 30, 2010, now Pat. No. 8,593,960.

(51) Int. Cl.
*H04L 12/26* (2006.01)
*H04L 12/28* (2006.01)
(Continued)

(52) U.S. Cl.
CPC .......... *H04L 47/826* (2013.01); *H04L 12/5693* (2013.01); *H04L 45/06* (2013.01); *H04L 47/50* (2013.01)

(58) Field of Classification Search
CPC ........... H04L 12/5689; H04L 12/5693; H04L 12/5694; H04L 12/5695; H04L 2012/5678; H04L 2012/5679; H04L 2012/5681; H04L 2012/6489; H04L 45/44; H04L 47/10; H04L 47/30; H04L 47/50; H04L 47/70; H04L 49/15; H04L 49/1553; H04L 49/253; H04L 49/254; H04L 49/30; H04L 49/3018; H04L 49/3027; H04L 49/90

See application file for complete search history.

(56) References Cited

U.S. PATENT DOCUMENTS 5,878,265 A    3/1999    Hartmann
5,943,423 A    8/1999    Muftic
(Continued)

FOREIGN PATENT DOCUMENTS

TW    200633394    9/2006
TW    200637221    10/2006
TW    200948006    11/2009

OTHER PUBLICATIONS

"A Highly Resilient Routing Algorithm for Fault-Tolerant NoCs", David Fick, et al. Design, Automation and Test in Europe Conference and Exhibition, 2009.
(Continued)

*Primary Examiner* — Alpus H Hsu
(74) *Attorney, Agent, or Firm* — Trop, Pruner & Hu, P.C.

(57) ABSTRACT

In one embodiment, the present invention includes a method for determining whether a packet received in an input/output (I/O) circuit of a node is destined for the node and if so, providing the packet to an egress queue of the I/O circuit and determining whether one or more packets are present in an ingress queue of the I/O circuit and if so, providing a selected packet to a first or second output register according to a global schedule that is independent of traffic flow. Other embodiments are described and claimed.

14 Claims, 6 Drawing Sheets

(51) Int. Cl.
*H04L 12/54* (2013.01)
*G06F 15/16* (2006.01)
*G06F 15/173* (2006.01)
*G06F 3/00* (2006.01)
*H04L 12/911* (2013.01)
*H04L 12/721* (2013.01)
*H04L 12/863* (2013.01)

(56) References Cited

U.S. PATENT DOCUMENTS

| | | | |
|---|---|---|---|
| 6,009,488 A | 12/1999 | Kavipurapu | |
| 6,088,360 A | 7/2000 | Amaral et al. | |
| 6,574,230 B1 | 6/2003 | Almulhem et al. | |
| 6,813,268 B1* | 11/2004 | Kalkunte | H04L 69/161 370/392 |
| 6,920,135 B1* | 7/2005 | Lea | H04L 49/1507 370/389 |
| 6,920,510 B2* | 7/2005 | Chang | G06T 9/007 709/212 |
| 6,975,626 B1* | 12/2005 | Eberle | H04L 12/5693 370/358 |
| 7,123,623 B2* | 10/2006 | Sharma | H04L 15/5601 370/358 |
| 7,154,885 B2* | 12/2006 | Nong | H04L 12/5601 370/380 |
| 7,170,900 B2* | 1/2007 | Berggreen | H04L 12/5693 370/389 |
| 7,185,138 B1 | 2/2007 | Galicki | |
| 7,221,647 B2* | 5/2007 | Moriwaki | H04L 15/5601 370/230 |
| 7,221,678 B1* | 5/2007 | Hughes | H04L 12/5693 370/401 |
| 7,285,487 B2* | 10/2007 | DeHon | G06F 15/8023 257/E21.495 |
| 7,292,594 B2* | 11/2007 | Meempat | H04L 49/101 370/413 |
| 7,346,067 B2* | 3/2008 | Chung | H04L 12/5693 370/412 |
| 7,426,185 B1* | 9/2008 | Musacchio | H04Q 3/68 370/235.1 |
| 7,493,406 B2 | 2/2009 | Amini et al. | |
| 7,710,904 B2 | 5/2010 | Chrysos | |
| 7,782,770 B1* | 8/2010 | Pannell | H04L 49/25 370/229 |
| 7,916,135 B2 | 3/2011 | Kuo et al. | |
| 7,983,287 B2* | 7/2011 | Musacchio | H04L 49/254 370/415 |
| 8,189,612 B2* | 5/2012 | Lemaire | G06F 15/7867 370/463 |
| 8,194,690 B1 | 6/2012 | Steele et al. | |
| 8,644,155 B2* | 2/2014 | Kure | H04L 12/5693 370/229 |
| 8,665,841 B1* | 3/2014 | Goel | H04L 69/22 370/327 |
| 8,699,426 B2 | 4/2014 | Gaal et al. | |
| 9,158,575 B2* | 10/2015 | Smith | G06F 9/4843 |
| 2003/0048792 A1 | 3/2003 | Xu et al. | |
| 2003/0081624 A1 | 5/2003 | Aggarwal et al. | |
| 2004/0037306 A1 | 2/2004 | Khan et al. | |
| 2004/0141494 A1* | 7/2004 | Beshai | H04L 49/106 370/352 |
| 2004/0151197 A1 | 8/2004 | Hui | |
| 2004/0187087 A1 | 9/2004 | Eneboe et al. | |
| 2005/0050007 A1 | 3/2005 | Sampson | |
| 2005/0141254 A1* | 6/2005 | Hong | G11C 5/066 365/51 |
| 2005/0207440 A1 | 9/2005 | Tyan et al. | |
| 2006/0193318 A1* | 8/2006 | Narasimhan | H04L 12/5693 370/389 |
| 2006/0200825 A1 | 9/2006 | Potter | |
| 2007/0299803 A1 | 12/2007 | Emuchay et al. | |
| 2008/0164907 A1 | 7/2008 | Mercaldi-Kim et al. | |
| 2008/0198867 A1 | 8/2008 | Moll et al. | |
| 2009/0040984 A1 | 2/2009 | Rajamani | |
| 2010/0158023 A1* | 6/2010 | Mukhopadhyay | G06F 15/7825 370/401 |
| 2011/0022871 A1* | 1/2011 | Bouvier | G06F 1/3206 713/340 |
| 2011/0103799 A1 | 5/2011 | Shacham et al. | |

OTHER PUBLICATIONS

Chinese Patent Office, Office Action Mailed Sep. 27, 2014, in Chinese Office Application No. 201180032585.X. (Redacted).

Taiwan Patent Office, Office Action mailed Jun. 10, 2015, in Taiwanese Patent Application No. 100123127. (Translation Redacted).

Patent Cooperation Treaty, "Notification of Transmittal of International Search Report and Written Opinion of the International Searching Authority," in international application No. PCT/US2011/042431, mailed Feb. 9, 2012.

Larry Seiler, et al., "Larrabee: A Many-Core x86 Architecture for Visual Computing," Aug. 2008, pp. 1-16.

Intel Corporation, "An Introduction to the Intel QuickPath Interconnect," Jan. 2009, 22 pages.

Korean Intellectual Patent Office, Notice of Preliminary Rejection, dated Apr. 15, 2009, in Korean patent application No. 10-2007-0137905.

* cited by examiner

PROVIDING A BUFFERLESS TRANSPORT METHOD FOR MULTI-DIMENSIONAL MESH TOPOLOGY

This application is a divisional of U.S. patent application Ser. No. 12/827,495, filed Jun. 30, 2010, the content of which is hereby incorporated by reference.

BACKGROUND

As semiconductor technology advances in the form of smaller and faster circuitry, more and more components can be implemented in a single semiconductor die. One type of die is a so-called system-on-chip (SoC) in which multiple agents are present that can be used to process data and perform other operations. Interconnectivity between these agents is achieved by a network-on-chip (NoC), which can be based on various methods including a packet-routing network, a bus, ring or so forth. However, these approaches can have issues with regard to design complexity, limited scalability, or area/power efficiency. Furthermore, some of the known interconnections may exhibit complex deadlock/contention problems to be resolved.

Most implementations include some type of buffer medium as part of the transport mechanism between agents, given that due to traffic considerations, latencies and so forth, multiple packets may be present in the transport mechanism between agents. While a ring can provide for a bufferless medium, such rings have historically been of a single dimension such that the ring concept does not leverage to multi-dimensions.

DETAILED DESCRIPTION

In various embodiments, bufferless and routerless intersecting rings, so-called "routerless I-rings," may be provided to enable interconnections of on-chip nodes such as may be present in a system on chip (SoC) or other semiconductor device. Such an SOC may include various types of designs including multi-core and many-core central processing unit (CPU) designs with high agent counts including agents such as cores, caches, accelerators, memory controllers and so forth.

An interconnect network in accordance with an embodiment of the present invention can be designed to be of two or higher dimensions. In general, the network includes: (i) a bufferless transport medium; (ii) an ingress access point (for scheduling packets into the transport medium); and (iii) an egress receiver point (to pull packets from the transport medium). In many embodiments, the bufferless transport medium may include a set of synchronously clocked nodes arranged in an n×m mesh. Each such node may include networking related hardware, and in turn may be coupled to a corresponding agent such as a core, cache, accelerator, etc.

Figure 1:
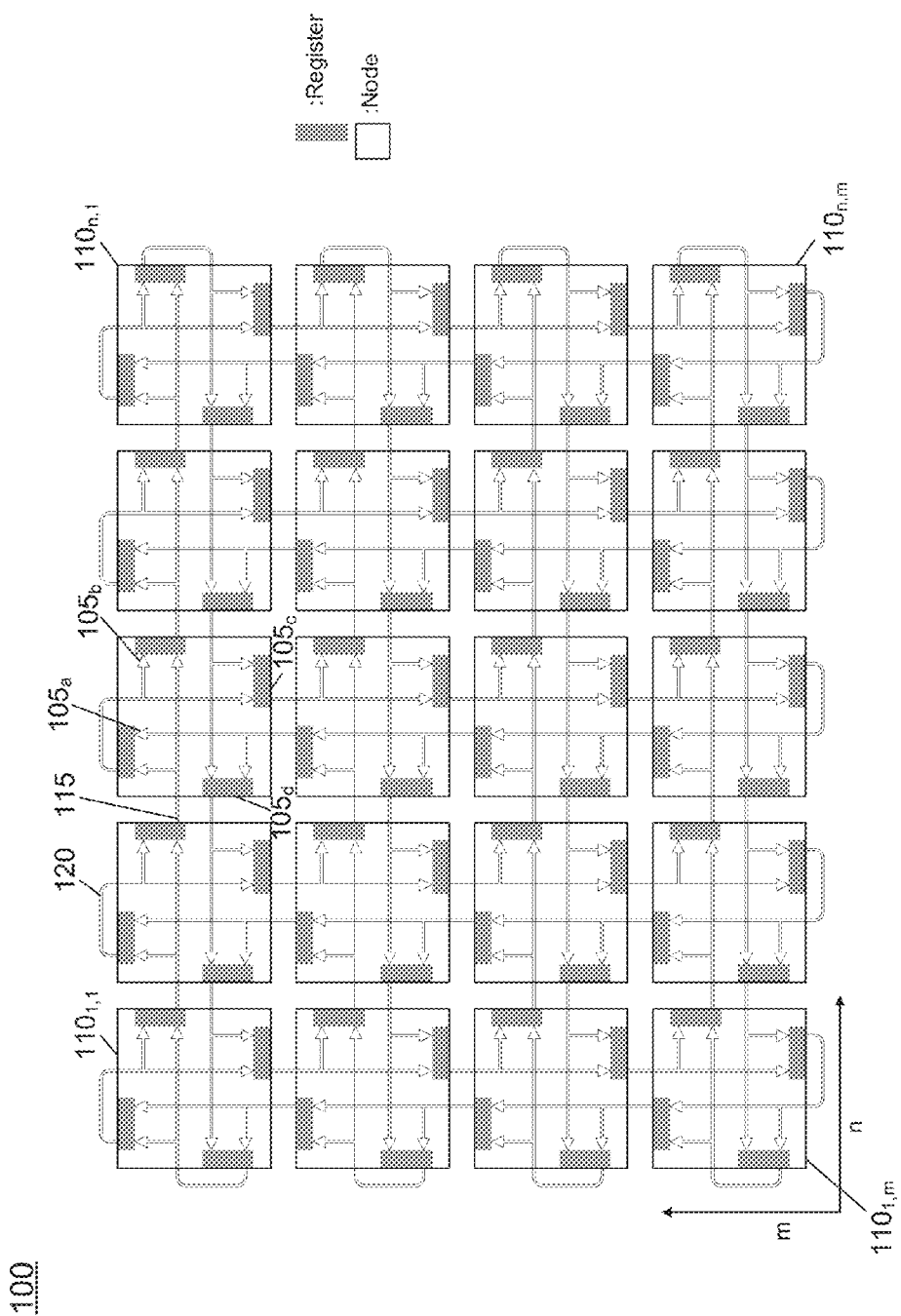
FIG. 1 is a block diagram of a mesh interconnection system in accordance with one embodiment of the present invention.

Referring now to FIG. 1, shown is a block diagram of a mesh system in accordance with one embodiment of the present invention. As shown in FIG. 1, system 100 may be implemented as a two-dimensional (2D) link interconnect mesh including a plurality of nodes $110_{1,1}$-$110_{n,m}$. In various embodiments, system 100 may be a system-on-chip (SoC), or other such single chip semiconductor device that is formed on one semiconductor die, while in other embodiments a system may be formed of multiple-stacked die, thus enabling a mesh having greater than two dimensions. In different implementations, the agent may be heterogeneous or homogeneous such as processor cores, cache blocks, memory controllers, dedicated processing units such as graphics processors, packet processors and so forth. In general, a node may be associated with an agent (e.g., core or other processing or control unit), and may include interconnect related input/output (I/O) circuitry as described below.

Still referring to FIG. 1, each node 110 may be coupled to multiple other nodes of the 2D configuration via a plurality of interconnects 115, which may be bidirectional interconnects. In addition, the edge nodes (that is, the nodes at the periphery of the system) may include feedback interconnects 120 which couple outputs ports of the corresponding nodes to input ports of the same or other edge node. In the high level view of FIG. 1, only I/O circuitry (e.g., routing structures) are shown. That is, there is no illustration in FIG. 1 of the actual functional units of the agents. In general, each node may include a plurality of input and output ports. In general, these input and output ports may include logic and other circuitry to effect the selection and transfer of received information (such as packets) through the mesh interconnection. Note that the implementation shown in FIG. 1 is representative, and does not fully reflect the full switching or configurations available within a node. That is, as will be discussed further below, each node can be configured according to multiple routing patterns to route data to different nodes to which a given node may be connected.

As seen in FIG. 1, each node 110 has four bidirectional links to its neighboring nodes (with special feedback rules at the edge nodes). The number of links may increase with the number of dimensions. In each clock cycle, at least one packet can be received by each of a plurality of input ports of each node. The incoming packets may be locally consumed or passed to one of a plurality of output ports of each node where they are transmitted to adjacent nodes in the next cycle. In this way, the transport medium is therefore bufferless. Note that details of the I/O circuitry are not shown in FIG. 1. Instead, only a plurality of output registers $105_{a-d}$ are shown, each of which is associated with a given output port and thus is the component from which a selected packet is sent from a node. Since an output port may also receive packets from the local agent coupled to the node aside from the respective plurality of input ports, a multiplexer (not shown in FIG. 1) may be present in front of each output register 105.

The route taken by a packet is determined by the a priori defined and traffic independent sequence of connection states of the single nodes. The sequence may be chosen to be identical for all nodes or individually composed for each node. At any time, as determined by the node specific sequences, all nodes of the mesh are in one of a plurality of predefined, traffic independent connection states mapping input ports to output ports. While the scope of the present invention is not so limited, in one embodiment, all nodes may follow the same sequence built from two connection states, namely a pass-through state and a turn state, each of which enables communication in a different dimension.

Figure 2:
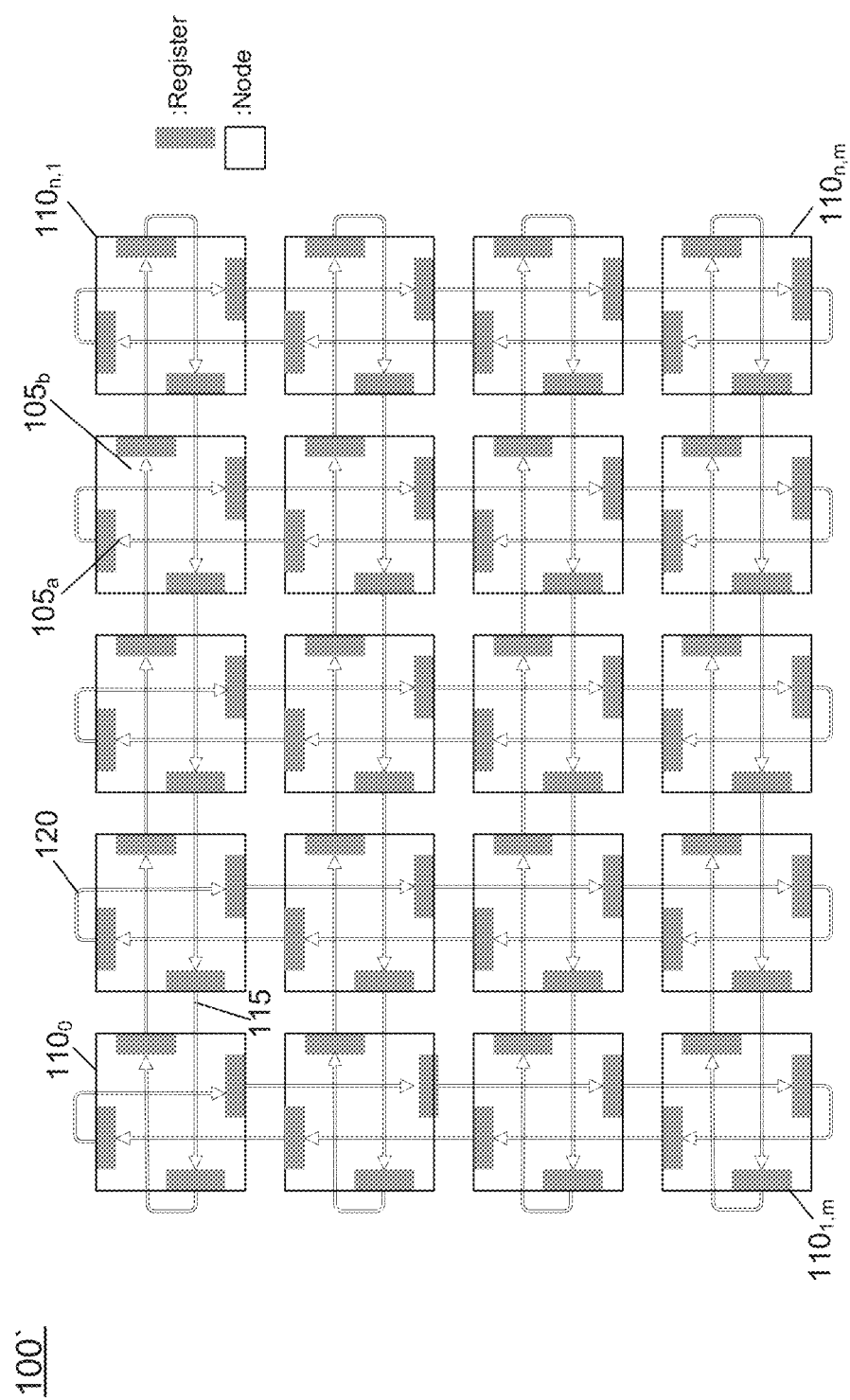
FIG. 2 is a block diagram of a mesh interconnection system that is configured in a pass-through state in accordance with an embodiment of the present invention.

Referring now to FIG. 2, shown is a block diagram of a mesh interconnection system 100' with all nodes in pass-through state. In this pass-through state, each node may be configured (e.g., by control of a multiplexer or other switch logic) to directly pass data received from a first neighboring node to a second neighboring node. In the implementation shown in FIG. 2, these nodes may be the horizontal or vertical neighboring nodes. As used herein, a neighboring node is a node immediately adjacent to a node in a given dimension. Note in the implementation shown in FIG. 2, edge nodes are coupled to interconnects 120 that provide for direct feedback such that in a pass-through mode of operation, data output by the edge node is also directly received in that same edge node. For ease of illustration in FIG. 2, other interconnections such as internal routing within the nodes are not shown to not obscure the state shown in FIG. 2.

In this pass-through state, the nodes simply forward packets from opposite sides and thus the mesh is decomposed into a set of horizontally and vertically overlayed, unconnected, rings. In some embodiments, pass-through communications occur in both directions based on control of the system to thus enable potentially more efficient communications, although complexity may increase in this instance.

While the pass-through state as represented in FIG. 2 enables communication of data between neighboring agents of a single dimension, to enable communication between nodes of different dimensions embodiments may configure the nodes to provide for one or more turn states. Such turn states may be used to communicate data between neighboring cores of different dimensions. Note that regardless of the selected state, each node may input and output equal numbers of packets per cycle, as the transport mechanism is bufferless.

Figure 3:
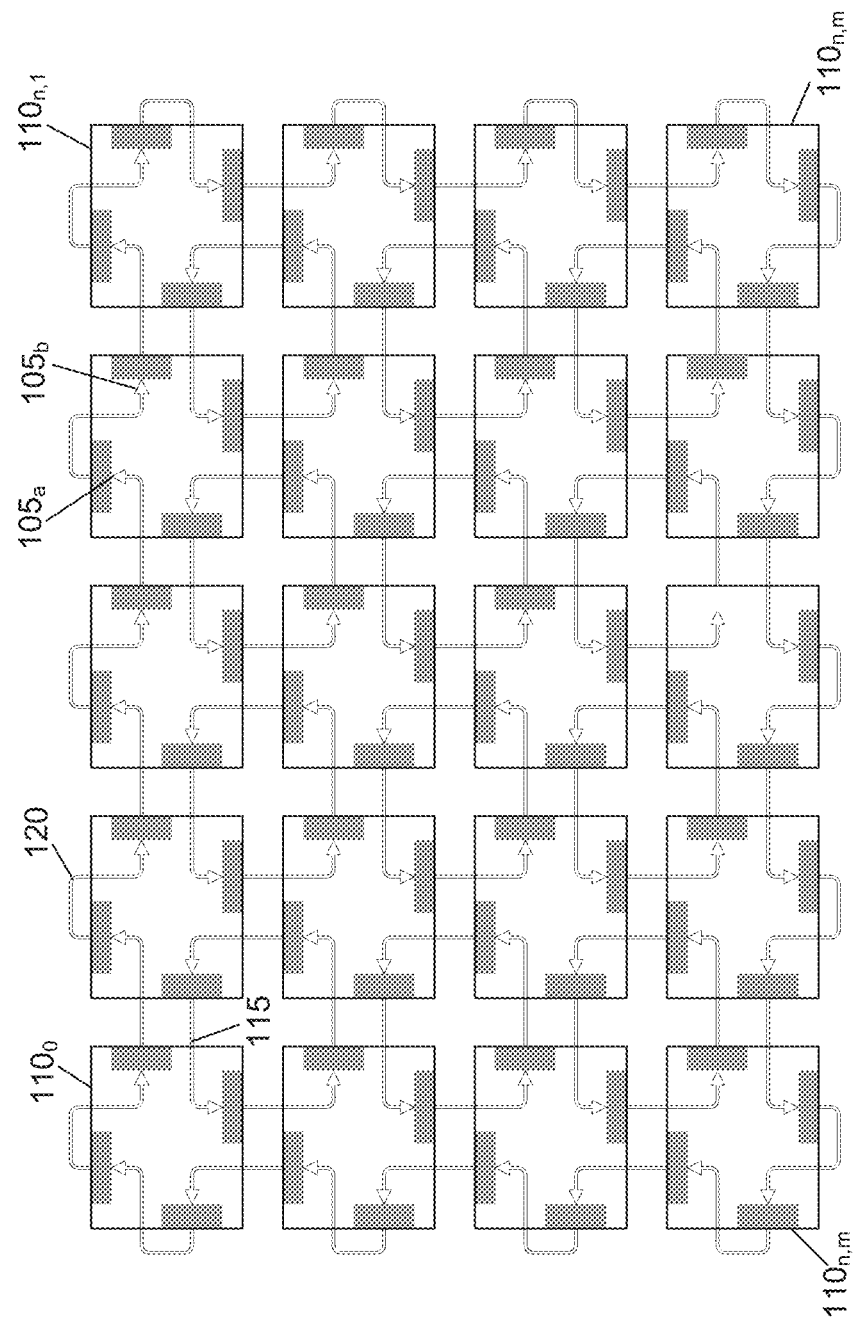
FIG. 3 is a block diagram of a mesh interconnection system that is configured in a turn state in accordance with an embodiment of the present invention.

Referring now to FIG. 3, shown is a block diagram of a mesh interconnection system that is configured in a turn state. As seen in FIG. 3, system 100' is now configured such that each incoming packet is routed in a different direction than the pass-through direction. In this state each node routes an incoming packet left. This results in the incoming packets at each node being interchanged between horizontal and vertical rings (that were established in the pass-through state). In the illustration of FIG. 3, this turn state may be a left turn such that packets are communicated to the next neighboring node. Note that again with respect to the illustration of FIG. 3, edge nodes may be configured via a feedback interconnect 120 to receive directly a packet output from an output port of the node via an input port of the node. While shown with a left turn state in the illustration of FIG. 3, the scope of the present invention is not limited in this regard, and in other implementations, this turn state may be a right turn state.

In one embodiment, states are selected according to a cyclic schedule that can be completely independent from actual traffic on the medium. The schedule has to guarantee that at each sending node a time slot for insertion exists such that eventually the inserted packet arrives at the intended destination. One such scheme meeting this constraint is a cyclic schedule of S clocks (where, S=max(n,m)) comprising S−1 clock cycles with all nodes in the pass through state (FIG. 2) and 1 cycle with all nodes in the turn state (e.g., left, FIG. 3). More generally, a cyclic schedule can be of S clocks (where, S=max(n,m)) and S−x clock cycles are in the pass-through state (FIG. 2) and x cycles are in the turn state (e.g., left, FIG. 3). Such a cyclic schedule can, provably, establish at least one Manhattan route from each sending node to every other node. As used herein, the term "Manhattan route" is used to define a route with minimal travel distance between agents, without any roadblocks, detours, backwards tracking or so forth. Typically, additional viable paths not meeting the Manhattan property may exist. Other schedules are also feasible, like S=2*max(n,m) with again all nodes in pass-through configuration for S−1 cycles and a single cycle in turn configuration or so forth. While just one sequence applied to all nodes can suffice, multiple sets of sequences applied to respective subsets of nodes may be considered to improve certain characteristics of the medium. As an example, nodes may have individual sequences of connection states leading to multiple different connection states visible on a network layer for a given cycle. Further additional types of connection states may be considered like right turns or a combination of turn and pass-though configurations within one node In general, additional states may increase the number of inputs to a multiplexer of the output ports.

Figure 4:
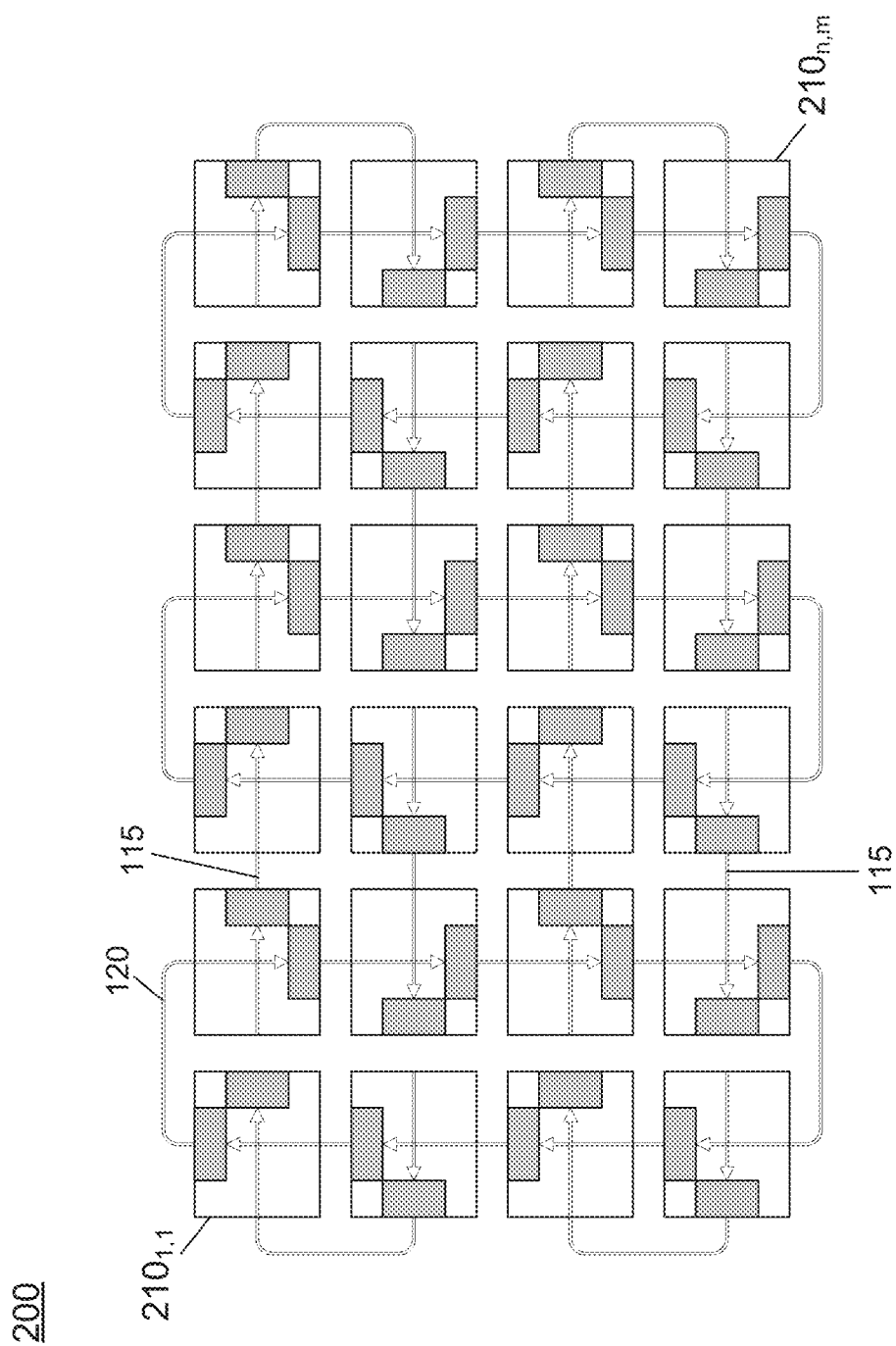
FIG. 4 is a block diagram of an interconnection system in accordance with another embodiment of the present invention.

It is to be understood that different topological variations exist, such as other feedback connection schemes at the edges of a node or reducing the mesh to a unidirectional transport mechanism. Referring now to FIG. 4, shown is a block diagram of an interconnection system in accordance with another embodiment of the present invention. As shown in FIG. 4, system 200 includes a plurality of nodes $210_{1,1}$-$210_{n,m}$. Note in this implementation, only uni-directional interconnects 115 couple neighboring nodes together. In addition, note that instead of feedback paths for edge nodes, interconnects 120 are present to couple neighboring nodes of a common dimension. In other aspects, system 200 may be configured similarly to that of FIG. 1 described above.

With reference back to FIG. 1, at the source node, for each destination node a table of insertion time slots (slot table) exists for each output stage to ensure delivery of the inserted packet to the intended destination node. For the mesh operation of FIG. 1 and assuming a fixed schedule period of S clocks, the sequence of valid insertion options becomes also cyclic with the period of S and thus may vary between 1 and S depending on the source/destination combination. The table is only dependent on the mesh topology and the cyclic schedule, and thus can be precomputed by different methods. In some embodiments, the table may be derived using an analytical expression or via exhaustive self-discovery. This table may in some embodiments be implemented in a non-volatile storage of each node. Also the table may be constructed on the fly by a respective function implemented by logic gates taking clock cycle count as well as source and destination information as input parameters. Or, the predetermined table can be dynamically loaded on power up to a volatile storage of the node. In particular embodiments, each output port of a node may include its own table, which is predetermined to reflect its particular connection within the mesh system. In one embodiment, each entry of the table may include a destination identifier and a corresponding cycle slot at which a packet for that destination is to be inserted via an output port. In some other embodiment a single table entry is provided per destination containing an S bit wide vector, where each bit n marks if insertion in the respective clock cycle n of the cyclic pattern is viable. In some embodiments, the table may further include heuristic data to aid output port logic in determining which packet is to be provided in a given slot. For example, for destinations where only one or two dedicated slots can reach the destination, a heuristic to select packets can be established for those precious slots over packets that have more options available for reaching their intended destinations. In this way, priority for a given packet may dynamically change based on packets pending for transmission. The global synchronization of the connection state sequences of the single node may be based on a master or global control signal provided to each of the multiplexers of the system. In some other embodiment synchronization may be achieved by special packets sent at network initialization.

When a packet is passed by agents associated with the respective node for packet insertion via the I/O circuitry, it can be intermediately stored in an ingress buffer until an appropriate time slot for transmission is reached, with no data allocated at the respective output port. That is, the system is configured such that due to its bufferless operation, incoming packets to an input port take precedence over locally generated packets, as there is no ability to maintain the received packets in a buffer or other storage structure.

To improve the maximum injection rate per port, multiple packets provided by the local agents may be processed in parallel, in some embodiments. As there typically exist multiple combinations of time slot and output ports for a packet to enter the network (or multiple packets may enter at the same timeslot), various heuristic algorithms can be applied to improve network performance. In these algorithms, options leading to optimal Manhattan routes may be preferred. As one example, other viable but inefficient routes (due to long paths in the network) may be removed (or deprioritized) from the tables. In cases of multiple packets contending for the same output port at the same timeslot, packets with fewer insertion options may be prioritized. Still further, such heuristic rules can be dynamically adapted. Meeting real-time requirements with this network is easy to achieve due to the deterministic behavior of the medium. To this end, deterministic slot pre-allocation mechanisms may be present.

For each input port, incoming packets are checked for their destination address. This checking can be based on different destination encodings, e.g., an absolute value (such as a destination identifier) or a down-counter decremented at each passing hop. In case of a match, the incoming packet is locally stored in a per-input port instantiated egress receiver queue and the respective slot on the mesh is marked as empty. To realize such operation, a receiver may have a local over-speed clock to allow reception of packets from all input ports in parallel at a given cycle. To eliminate such over-speed, in some other embodiment receivers may be restricted to only observe a deterministic subset of input ports at a given time, which is reflected accordingly in the respective entries of the slot tables. In addition, the input port logic may mark the slot as empty so that a subsequent node can use the slot for data insertion (assuming the current node does not). In one embodiment, a single bit indicator may be used to indicate whether the slot is actually allocated to data or is an empty slot. Note that a receiver port may choose to not sink an incoming packet destined for it (e.g., for power, resource, or other reason). The fabric allows for such "bounce" conditions and ensures that the packet is redelivered to its destination again after a finite period. That is, the fabric can support the ability to bring a packet back to its destination node in a deterministic manner. In different situations, this originally non-delivered packet may go back to its source, where information regarding its non-delivery can be used for flow control or other purposes.

Various micro-architectural improvement techniques may be applied to an I-ring interconnect in accordance with an embodiment of the present invention. For example, physical timing may be improved by allowing control signals that flag empty slots to run ahead on an identical operated mesh by a fixed cycle count to enable receiver pipelining. Also destination decoding may be pipelined by moving it to the preceding node, as will be described further below.

Embodiments may also enable scaling of rings beyond two-dimensions. For example, a topology of p n×m meshes can be "stacked" together. In such implementations, each n×m mesh may be located on one or more different layers of a semiconductor die. Alternately, multiple stacked die may be present, with each die including a m×n mesh in these implementations. At each node, a "switch" state may be provided to allow "packet swapping" between the 3 rings that intersect in a vertical dimension. Just as a 2-state minimal switching mechanism suffices for a 2-D mesh, a 3-state minimal switching mechanism will suffice for a 3-D stack of meshes. Of course, additional states and cyclic schedules can be created to optimize various network parameters.

Figure 5:
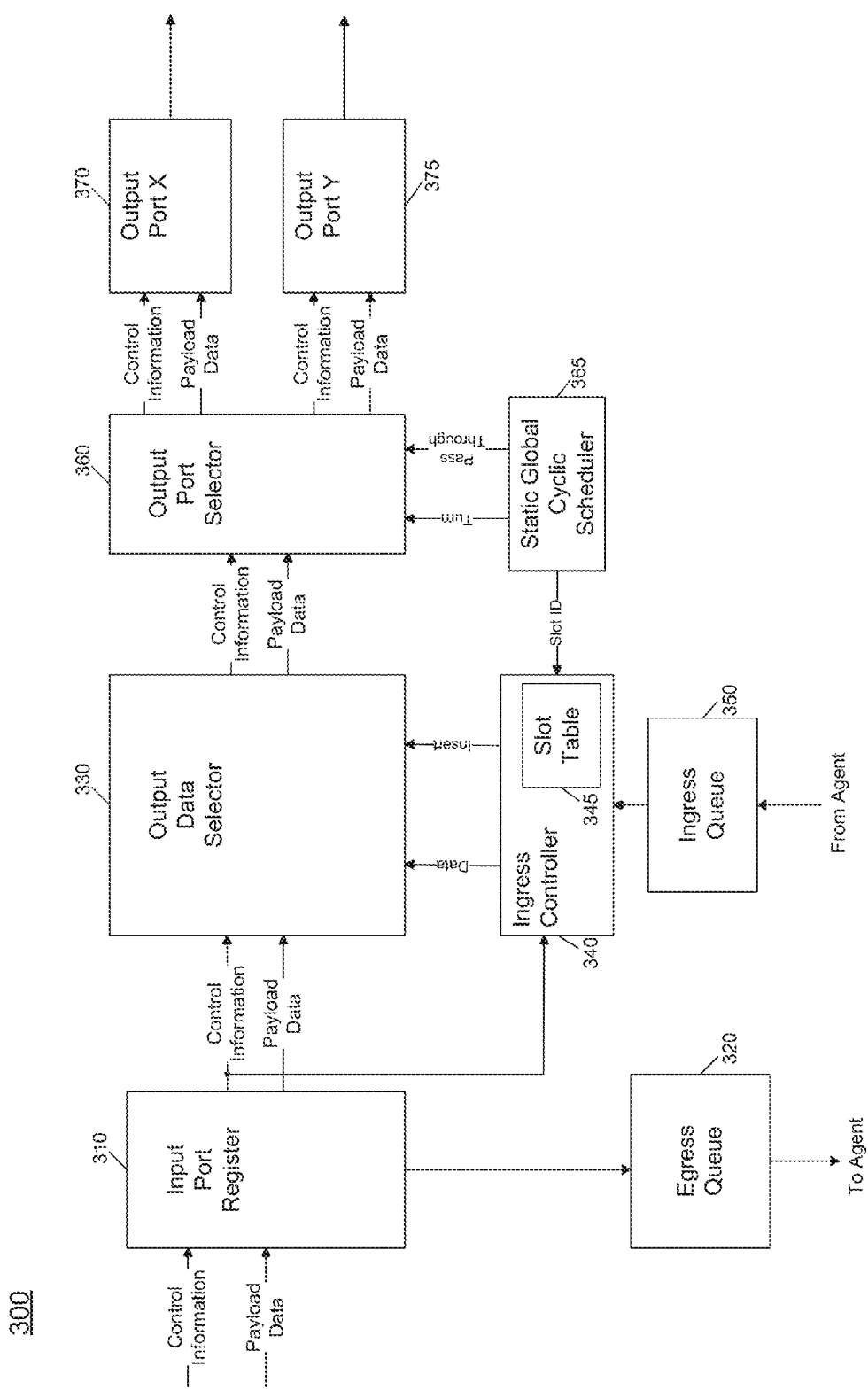
FIG. 5 is a block diagram of a node in accordance with an embodiment of the present invention.

Referring now to FIG. 5, shown is a block diagram of a single input data path of a network node in accordance with an embodiment of the present invention. Multiple instantiations of this path may be present in each node of a NoC. Specifically, in one embodiment, four such circuits may be present to form a node, each configured to receive incoming data from a first direction and to output data to a second direction opposite the first direction or a third direction, namely a turn direction.

In the implementation shown in FIG. 5, incoming information may be received in an input port register 310. In some embodiments, based on a presence or validity indicator (active when no packet is to be output), control of a clock for an input register can occur to reduce power consumption by disabling the register when no valid data is incoming. The information received may include payload data and status/control information. Status/control information may be used to indicate whether incoming data is valid as well as other control information such as a destination identifier for the corresponding packet, quality of service (QoS) related information such as a reservation bit keeping the slot free for a given connection and so forth. As seen, if incoming payload data is for one of the agents associated with the node, e.g., as indicated by destination indicator present in the control information, the payload data is provided to an egress queue 320. From there, the data may be provided to one of the agents associated with the node such as a core, a memory controller or other such processing unit.

Otherwise the data and control information both pass to an output data selector 330, which generally is used to select either the data received via input port register 310, or data generated in the node, received from an agent of the node. Thus as seen in FIG. 5, an ingress queue 350 is coupled to receive data of the agents desired to be sent to another node. In turn, the ingress queue is coupled to an ingress controller 340. In general, ingress controller 340 may select one of multiple data packets for insertion into an open slot, based on information present in a slot table 345. As discussed above, slot table 345 may be accessed by a destination identifier for the corresponding packet and may be used to indicate an appropriate slot for insertion of the packet. As seen, additional information used by ingress controller 340 to select a data packet for insertion is a slot identifier, received from a static global cyclic scheduler 365, further details of which are discussed below. Accordingly, based on control of ingress controller 340, output data selector 330 will output either the payload data received from input port register 310, or data received from ingress controller 340 (namely data originating in the node itself).

Still referring to FIG. 5, output data selector 330 is coupled to an output port selector 360 which is controlled by a static global cyclic scheduler 365 representing the sequence of connection states of the node. Specifically, in an implementation in which two states are present, namely a pass-through state and a turn state, for each time slot the scheduler will generate a control signal to cause output port selector to forward the control and payload data to one of a first or second output port 370 and 375. In one embodiment, output port 370 may output the information for a pass through slot, while an output port 375 may output the information for a turn slot. While shown with this particular implementation in the embodiment of FIG. 5, understand the scope of the present invention is not limited in this regard.

For example, as discussed above, additional states may be present and accordingly, more output ports may be present, each configured to output information to a different neighboring node to which the present node is coupled. Further, while in many implementations incoming traffic takes priority such that when it is present, output logic only passes the incoming packet and does not insert a new packet in the next slot, embodiments are not so limited. That is, in other embodiments an override configuration may be present such that an incoming packet can be replaced in favor of insertion of a new packet (presumably of a higher traffic class). For example, the node can sink the packet (e.g., to a cache) and based on a flow control scheme later inject the packet, or the original sender of the replaced packet can be informed, e.g., by a no acknowledgment message, so that the packet can be resent.

Figure 6:
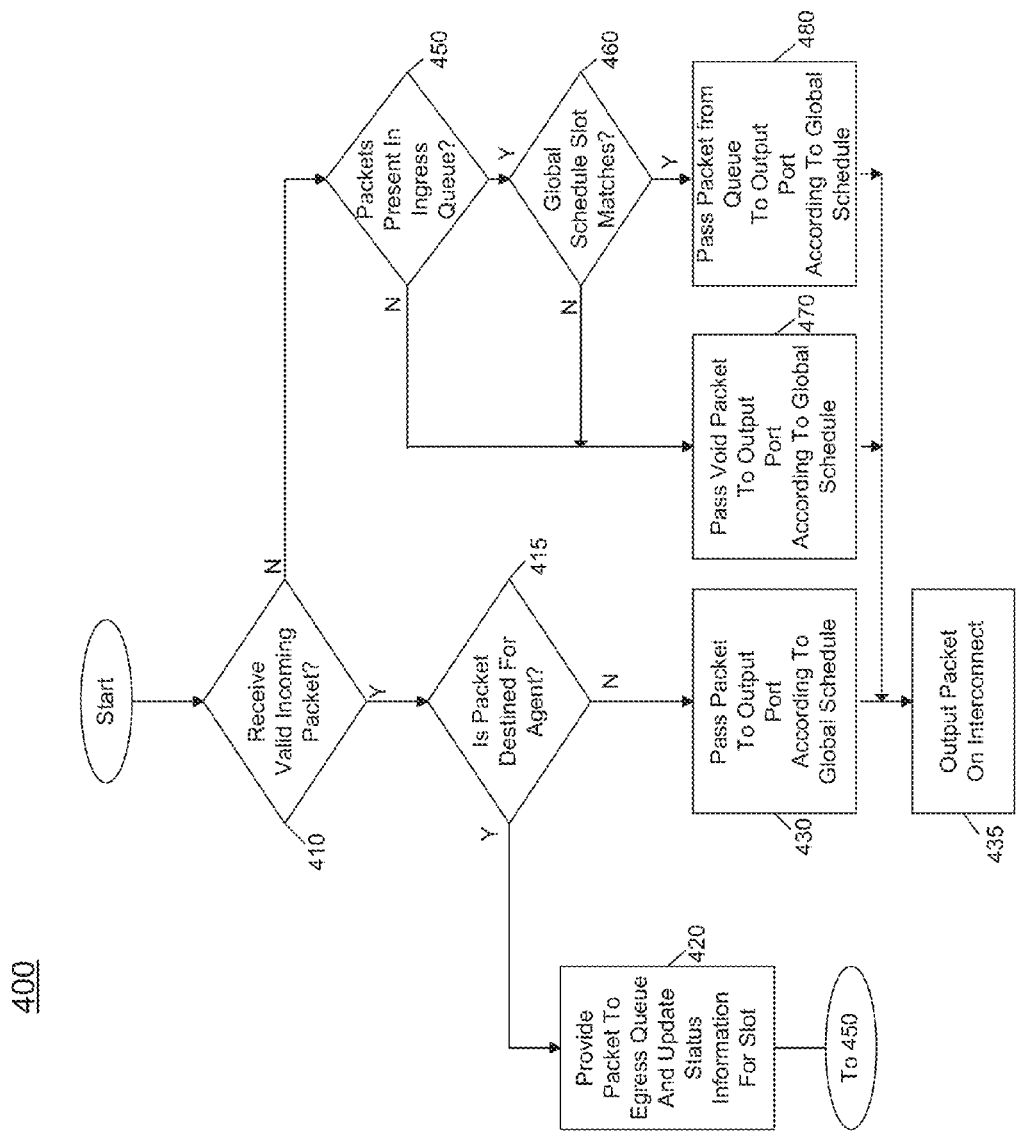
FIG. 6 is a flow diagram of a method for communicating packets according to a static global cyclic schedule in accordance with an embodiment of the present invention.

Referring now to FIG. 6, shown is a flow diagram of a method for communicating packets according to a static global cyclic schedule in accordance with an embodiment of the present invention. As shown in FIG. 6, method 400 may begin by determining whether a valid incoming packet has been received (diamond 410). This determination may be made, for example, in an input port register that receives payload data and various control information and from this, can determine whether the incoming payload data is valid. If so, it may further be determined whether the packet is destined for an agent associated with the current node (diamond 415). This determination, which may also be made in the input port register, may be based on a destination identifier associated with the packet. If so, control passes to block 420, where the packet may be provided to an egress queue. In addition, status information associated with this slot may be updated. For example, a valid indicator may be reset to indicate that no valid data is present in this slot and accordingly, this slot is available for insertion of data.

Still referring to FIG. 6, if instead it is determined that the incoming packet is not destined for the current node, control passes from diamond 415 to block 430 where the packet may be passed to a selected output port according to a global schedule (block 430). This global schedule may dictate whether the packet is to be passed out of the node in a first direction or a second direction. Based on this global schedule then, control passes to block 435 where the packet may be output on an interconnect.

Still with reference to FIG. 6, if at diamond 410 it is determined that a valid packet is not received (or where a received packet is destined for the associated agent), control passes to diamond 450, where it may be determined whether one or more packets are present in an ingress queue. If not, control passes to block 470, where a void packet may be passed to the output port. This void packet, namely a null data payload and control information to indicate an invalid packet, may thus be provided to another node, which can then insert a packet of its own in that slot.

If at diamond 450 it is determined that one or more packets are present, control passes to diamond 460 where it may be determined whether a global schedule slot matches one of the packets. If not, control passes to block 470, discussed above. If there is a match, control instead passes to block 480 where a packet may be provided from an ingress queue to a selected output port according to the global schedule. Note that the determination as to which of multiple pending packets is to be transmitted can be based on the information in the table, as well as an understanding of the current slot of the global schedule. For example, the table information may associate slot identifiers with destinations. Various heuristics also may be taken into account in selecting one of multiple packets for output. In this way, priority information can be part of the basis of the determination. Still further, heuristics regarding the availability of multiple slots (or not) for a given packet to be inserted into the network can be used as part of the basis for the determination. Accordingly, as between two packets, a packet that has fewer slots into which it can be inserted may be selected ahead of a packet having greater available slots into which it can be inserted.

Thus in basic implementations the determination of which of multiple packets is to be selected can be based on slot identifier and destination identifier, while in more advanced implementations additional details regarding various heuristics can be taken into account. Then as seen, control passes to block 435 for output of this packet on the interconnect. While shown with this particular implementation for FIG. 6, understand the scope of the present invention is not so limited.

For example, in some embodiments a pipelining implementation may be present in which the determination of whether a packet is destined for a given node is performed in a neighboring (i.e., a previous) node. That is, this determination may be made in the previous node and can be forwarded, e.g., via a one bit wire either in a look ahead manner or as part of the normal control information. In either event, using a pipelining implementation, it can be determined ahead of time that an ingress controller can start selecting a packet for insertion into an available slot. One mechanism to make the determination in the previous node as to whether a packet is destined for the next node may be via a count down mechanism. For example, rather than a destination identifier that corresponds to an intended node, a destination identifier may take the form of a count of nodes through which a packet is to pass between source and destination. Thus in each node through which the packet passes, this count down value is decremented. Accordingly, when this packet is received in the previous node, the count value may be decremented, e.g., to zero or one, indicating that the packet is intended for the next node. Accordingly, in a look ahead manner, a one bit wire may indicate that the next received packet by the intended node is for that node. To this end, some implementations may include separate pathways to pass this destination information as separate control information that can be provided through the IO circuitry such that these decisions can be made in advance.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining, in an input port register of a node of a system on a chip (SoC), whether incoming information received in the input port register is a valid incoming packet;
   after determining receipt of the valid incoming packet, determining whether the packet received in the node is destined for a core coupled to the node and if so, providing the packet to an egress queue of the node to enable the packet to be provided to the core;
   if the received packet is destined for the core, determining whether one or more packets are present in an ingress queue of the node and if so and the one or more packets queue match a global schedule, providing a selected one of the one or more packets from the ingress queue to a first output port or a second output port of the node according to the global schedule, the global schedule independent of traffic flow; and
   if the received packet is not destined for the core, providing the received packet to the first output port or the second output port according to the global schedule.

2. The method of claim 1, further comprising providing a void packet to the selected first or second output port, if none of the one or more packets present in the ingress queue match the global schedule for a current slot.

3. The method of claim 1, further comprising receiving an indication that the received packet is destined for the core from a neighboring node prior to receipt of the received packet in the node.

4. The method of claim 1, further comprising receiving an indication that the received packet is destined for the core in a slot of the global schedule prior to receipt of the received packet in the node.

5. The method of claim 1, further comprising forwarding received packets from the first output port for a first number of cycles of the global schedule and from the second output port for a second number of cycles of the global schedule.

6. A system on a chip (SoC) comprising:
   a plurality of nodes of a bufferless transport medium arranged as a mesh of the plurality of nodes, each node of the plurality of nodes comprising:
      an input port register to receive payload data and corresponding control information from a first neighboring node;
      an egress queue coupled to the input port register to receive the payload data and to forward the payload data to an agent associated with the node;
      an output data selector to select the payload data from the input port register or from the agent for output from the node;
      an ingress controller coupled to the output data selector to control the output data selector; and
      an output port selector coupled to the output data selector to output the selected payload data and corresponding control information according to a traffic independent sequence of connection states to a first output port coupled to a second neighboring node during a first cycle and to a second output port coupled to a third neighboring node during a second cycle.

7. The SoC of claim 6, further comprising a global cyclic scheduler coupled to the ingress controller and the output port selector, to control the output port selector.

8. The SoC of claim 6, wherein the first cycle corresponds to a pass-through state in which packets are communicated between the node and the second neighboring node in a first dimension, the second cycle corresponds to a turn state in which packets are communicated between the node and the third neighboring node in a second dimension, and a third cycle corresponds to another turn state in which packets are communicated between the node and a fourth neighboring node in a third dimension.

9. The SoC of claim 6, wherein the SoC comprises a plurality of stacked semiconductor dies, wherein the node is on a first semiconductor die, and further comprising a fourth neighboring node configured on a second semiconductor die stacked on the first semiconductor die.

10. A non-transitory machine-readable medium having stored thereon instructions, which if performed by a machine cause the machine to perform a method comprising:
    determining, in an input port register of a node of a system on a chip (SoC), whether incoming information received in the input port register is a valid incoming packet;
    after determining receipt of the valid incoming packet, determining whether the packet received in the node is destined for a core coupled to the node and if so, providing the packet to an egress queue of the node to enable the packet to be provided to the core;
    if the received packet is destined for the core, determining whether one or more packets are present in an ingress queue of the node and if so and the one or more packets queue match a global schedule, providing a selected one of the one or more packets from the ingress queue to a first output port or a second output port of the node according to the global schedule, the global schedule independent of traffic flow; and
    if the received packet is not destined for the core, providing the received packet to the first output port or the second output port according to the global schedule.

11. The non-transitory machine-readable medium of claim 10, further comprising instructions that if performed enable the machine to provide a void packet to the selected first or second output port, if none of the one or more packets present in the ingress queue match the global schedule for a current slot.

12. The non-transitory machine-readable medium of claim 10, further comprising instructions that if performed enable the machine to receive an indication that the received packet is destined for the core from a neighboring node prior to receipt of the received packet in the node.

13. The non-transitory machine-readable medium of claim 10, further comprising instructions that if performed enable the machine to receive an indication that the received packet is destined for the core in a slot of the global schedule prior to receipt of the received packet in the node.

14. The non-transitory machine-readable medium of claim 10, further comprising instructions that if performed enable the machine to forward received packets from the first output port for a first number of cycles of the global schedule and from the second output port for a second number of cycles of the global schedule.

\* \* \* \* \*